INVENTORS
JEAN CLAUDE LAVENIR & JEAN AGASSE
BY
Abraham A. Saffitz
ATTORNEY

INVENTORS
JEAN CLAUDE LAVENIR & JEAN AGASSE
BY
Abraham A. Saffitz
ATTORNEY

INVENTORS
JEAN CLAUDE LAVENIR & JEAN AGASSE
BY
Abraham A. Saffitz
ATTORNEY

INVENTORS
JEAN CLAUDE LAVENIR & JEAN AGASSE
BY
Abraham A. Saffitz
ATTORNEY

INVENTORS
JEAN CLAUDE LAVENIR & JEAN AGASSE
BY
Abraham A. Saffitz
ATTORNEY

United States Patent Office 3,427,594
Patented Feb. 11, 1969

3,427,594

SYSTEM FOR THE TRANSMISSION AND REGISTRATION OF TELEPHONE CHARGES

Jean Claude Lavenir, 144 Ave. des Etats-Unis, Versailles, France, and Jean Agasse, 45 Rue Charles Gounod, Palaiseau, France Filed May 9, 1966, Ser. No. 548,458
Claims priority, application France, May 13, 1965, 16,842
U.S. Cl. 340—172.5 3 Claims
Int. Cl. G11b *5/00*

The present invention concerns a centralized telephone charging system.

Already known are centralized telephone charging systems which, for a telephone exchange and possibly for the sub-stations or satellites attached thereto, make it possible to know and to enter into a register, or several registers, information concerning connections just completed, each of these information or words containing the number and category of the subscriber having applied for said connection, the toll-charge relating to this connection and possibly the charge level, i.e. the item of the charge schedule applicable to the communications of the type concerned.

The present invention concerns a system of transmission of "charge words" produced in a charging center, to a charge reception and registration center and the registration of said words in the latter center. The charge reception and registration center is common to a great number of telephone exchanges. Thus, at the charging center the charge words are only registered in a temporary memory, for the time needed for their transmission, and only at the charge reception and registration center are they registered in a permanent, or more exactly semi-permanent memory, since they may be erased at regular intervals, for the establishment, for instance, of bi-monthly statements of charges for the subscribers.

Since the subscribers of a telephone exchange, or of a group of telephone exchanges, may have and do have quite different dealings, the capacity of a charge word in the permanent memory of the charge reception and registration center is arranged for average dealings and said permanent memory is moreover provided with overflow places in which subscribers with heavy dealings may overflow when their account exceeds a certain amount of binary digits. After each connection the charge word relating to this connection is transmitted from the charging center and applied to one of the entrances of an adder, whilst at the same time the address of the subscriber having requested the connection, also transmitted by the charging center, is written in the address register of the permanent memory of the charge reception and registration center. The account word of the calling subscriber (words with *p* binary digits) is extracted from the permanent memory and applied to the second entrance of the adder which effects the addition of the charge word and of the account word. If the capacity of the new account word does not exceed the standard capacity of a compartment of the memory, this new account word is re-entered in this memory at the address of the calling subscriber.

If the new account word does exceed the standard capacity of a memory compartment the charge transmission and registration system includes, according to a characteristic of the present invention, means to perform the following operation. The permanent memory, for instance a magnetic drum, contains overflow compartments arranged on overflow tracks and amongst these a specific compartment called "overflow address compartment." The overflow compartments are earmarked successively for the successive overflowing subscribers and the address of the last earmarked overflow compartment is entered in the specific overflow address compartment. As a result the system according to the invention contains means for testing the overflow of the new account after leaving the adder and, in cases where this test is positive, means for entering the non-overflowing part of the new account in the compartment containing the address of the calling subscriber, for storing aside this address temporarily whilst substituting the one of the specific overflow address compartment for it, for entering the temporarily stored aside address of the calling subscriber in the first available overflow compartment, the address of which was just found in the specific overflow address compartment, and for increasing the address entered in this overflow address compartment by one unit so as to designate for the next overflow operation the overflow compartment following the one which was just taken.

According to another characteristic of the invention the charge words transmitted between the charging center and the charge reception and registration center contain a so-called index part which indicates the fact that said word is transmitted for the first time, the second time, . . . and a check part serving for checking of the code. The receiver situated at the charge reception and registration center has a code check circuit and means for signalling code errors to the charging center and the transmitter situated at the charging center has means for modifying the index, for causing the retransmission of a given charge word once, twice . . . each time with a different index, when it receives the code error signal from the charge reception and registration center, and for releasing an alarm after having received from said registration center a code error signal repeated for a predetermined number of times.

The invention will now be described in detail, in connection with the attached drawings, in which:

FIGS. 1 to 3 represents the composition of the charge word such as it is supplied by the charging center, after transcoding in the charge transmission center and such as it leaves this charge transmission center.

Figure 1:
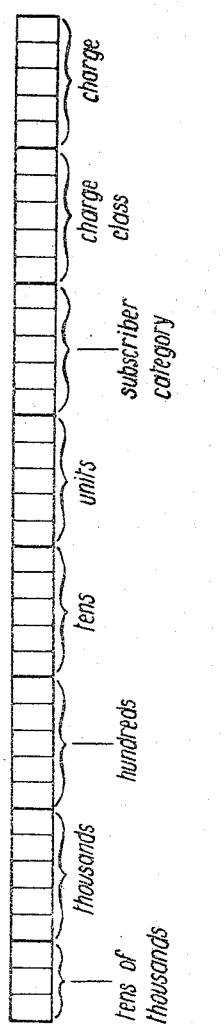
FIG. 1 represents the composition of the charge word furnished by the charging center.

At the entrance of the charge transmission center the word (FIG. 1) contains twenty-three binary digits representing tens of thousands (3), thousands (5), hundreds (5), tens (5) and units (5) of the number of the calling subscriber, five binary digits representing the category of the subscriber, five binary digits representing the charge and five binary digits representing the charge level or class. The charge is in pure binary code with check digit all other data are in 2 out of N code with $N=3$ for the tens of thousands and $N=5$ for the thousands, the hundreds, the tens and the units of the calling subscriber's number, his category and the charge level. There are thirty-eight binary digits in all.

Figure 2:
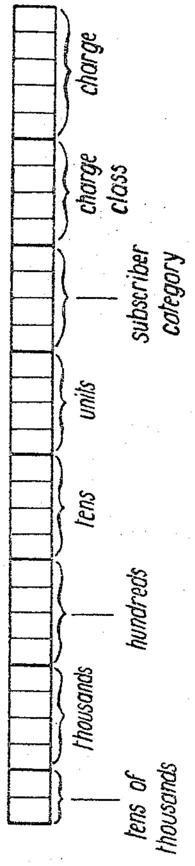
FIG. 2 represents the composition of the charge word after transcoding at the charge transmission center associated with the charging center.

The charge transmission center contains a transcoder which transcodes those data which are in code 2 out of N into coded decimal digits. The number of the tens of thousands (which is assumed to be equal to or lower than 4) then contains two binary digits instead of three, the numbers of the thousands, the hundreds, the tens and the units of the applicant's number (which are comprised between 0 and 9) each contain four binary digits instead of five, and the category, the charge class and the charge each contain four binary digits instead of five. There are thirty binary digits in all (FIG. 2).

In the charge transmission center supplementary binary digits are added to the thirty binary digits leaving the transcoder. These are:

Five binary digits forming a starting signal;
Two binary digits forming an index signifying that the charge word is transmitted for the first time or is repeated;
Nine binary elements forming a code checking group;
Two binary elements forming a stop signal.

Figure 3:
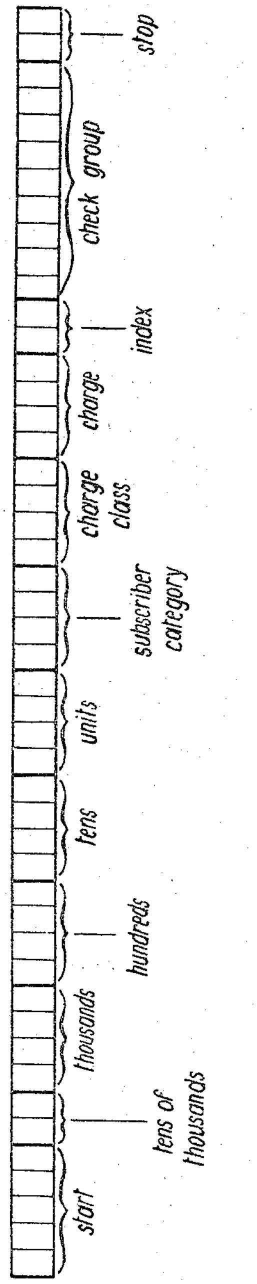
FIG. 3 represents the composition of the charge word such as it is transmitted by the charge transmission center.

There are fourty-eight binary elements in all (FIG. 3).

Figure 4:
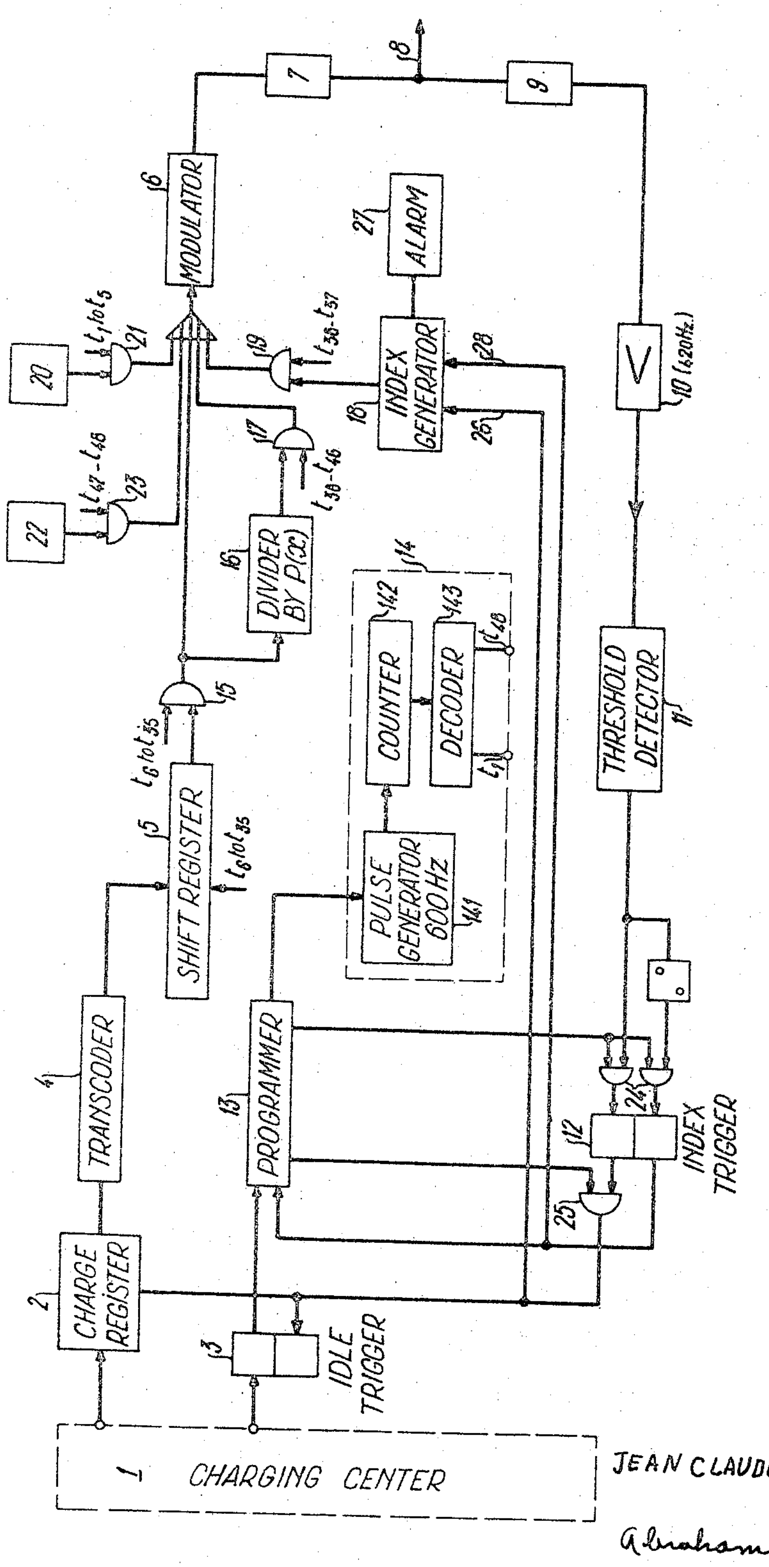
FIG. 4 represents the charge transmission center associated with the charging center.

Referring now to FIG. 4, 1 indicates a charging center in which the charge words of which the composition has just been shown are worked out. Such charging centers are known, as has been said above. Charging center 1 has two exits, one leading to a charge register 2 and the other to an availability flip-flop 3, situated in the charge transmission center. The charging center transfers to register 2, after having tested availability flip-flop 3 of the register, the charge word of FIG. 1 having thirty-eight binary elements and in which the digits of the calling subscribed's number and his category are in code 2 out-of-N. The exit of register 2 is connected to a transcoder 4 which, starting from the charge word of FIG. 1 of thirty eight binary digits, supplies the charge word of FIG. 2 of thirty binary digits; transcoder 4 is connected in parallel to a shift register 5 of which the exit is connected through a gate 15 to a transmission modulator 6. The transmission modulator is connected to transmission line 8 by means of high-pass filter 7; transmission modulator 6 is a frequency modulator, performing the transmission of binary elements Zero and One on two frequencies of 1300 and 2100 Hz.

Transmission line 8 is connected through a low-pass filter 9 to an amplifier 10 tuned to a frequency of 420 Hz. which is followed by threshold-detector 11. This detector 11 is connected to a so-called index flip-flop 12 which is placed in state one by an interruption of the continuous 420 Hz. signal on line 8 and placed in state zero when the permanent signal is re-established.

13 designates a programmer and 14 a time-basis. This time-basis contains an impulse generator 141 of 600 Hz. frequency, a counter 142 and a decoder 143. It should be noted that the frequency of the impulses produced by generator 141 depends on the speed of transmission of data on line 8; it is assumed here that this speed is 600 badus. Decoder 143 has forty-eight exits, $t_1$ to $t_{48}$ to make possible the formation of the charge word of FIG. 3. Programmer 13 initiates the time-basis for a cycle of forty-eight elementary time-intervals and inhibits it for 50 ms. at the end of each cycle to await and test the reply from the charge reception center which, as has been seen, may be either the persistence or the interruption of the continuous 420 Hz. signal.

The charge word of thirty binary digits $t_6$ to $t_{35}$ (FIG. 2) is completed by an index of two binary digits inserted at positions $t_{36}$ and $t_{37}$ and the word of thirty-two binary digits thus obtained is transcoded into error checking cyclical code by adding to it a check group of nine binary digits. Cyclic codes are well known in the domain of data transmission (see e.g. "Cyclic Codes for Error Detection" by W. Wesley Peterson, "Proceedings of the Institute of Radio Engineers," January 1961, pages 228–235 and "Error Correcting Codes" by the same author, the M.I.T. Press and John Wiley & Sons Inc.) and it is recalled that, to code a message G(X) of $k$ binary digits into a message P(X) of $n$ binary digits, $X^{n-k}$ G(X) is divided by P(X), P(X) being a polynominal of the order $(n-k)$, and the remainder R(X) resulting from the division by $X^{n-k}$ G(X) is added, to form the code polynominal $$F(X)=X^{n-k}G(X)+R(X)$$

In the example described $n=41$, $k=32$, $(n-k)=9$.

The word issuing from shift-register 5 is applied through gate 15 on the one hand to transmission modulator 6 and on the other hand to a divider 16 at the instants $t_6$ to $t_{35}$. Divider 16 divides the word applied thereto by a binary polynominal P(X) and the remainder of the division which is at most of order nine is applied to the transmission modulator 6 through gate 17 at the instants $t_{38}$ to $t_{46}$, therefore following the charge word proper. The binary digits of the "direct index" or of the "repeated index" are produced by an index generator 18, as will be seen, and applied to the transmission modulator through gate 19 at the instants $t_{36}$ and $t_{37}$ (in the described example a single binary digit would suffice but two binary digits have been provided for to distinguish if twice repeated and three times repeated messages are taking place).

A start signal (for instance group 10101 which contains four successive transitions from 1 to 0 and from 0 to 1) is produced by start signal generator 20 and added to the charge word at instants $t_1$–$t_5$ through gate 21. A stop signal (for instance group 11) is produced by stop signal generator 22 and added to the charge word at instants $t_{47}$–$t_{48}$ through gate 23.

Noting that the 420 Hz. return signal is interrupted when the error detection circuit of the charge reception center detects an error, as will be seen in the description of the charge reception and registration center, the functions of the charge transmission center are as follows:

If the charge word transmitted during a cycle $t_1$–$t_{48}$ has been correctly received by the charge reception center, the permanent 420 Hz. signal is present during the 50 ms. interval separating two successive cycles. During this interval programmer 13 opens gates 24 which positions index trigger 12 on 1 or 0, according to whether the 420 Hz. signal is present or absent. If it is present the programmer opens, still during the 50 ms. interval but after gates 24, gate 25, and availability trigger 3 and charge register 2 are reset, which indicates to the charging center 1 that it can send a new charge word to the charge transmission center.

If the 420 Hz. signal is absent at the exit of threshold detector 11 index trigger 12 is turned to zero. A signal is then sent to programmer 13 and to index generator 18 which places itself at position "charge word repetition" in which state it will send index 11 instead of index 00. Availability trigger 3 and charge register 2 are not reset; the programmer starts a new cycle $t_1$–$t_{48}$ during which a charge word identical to the one already transmitted is repeated, except for the fact that it contains the index "repeated" instead of the index "direct." The index generator is reset through wire 26 if the repeated word is properly received at the charge reception center. If the repeated charge word is once again received incorrectly a new signal is sent to index generator 18 through wire 28. The latter contains an alarm device 27 which is released when, after an initial repetition, the index generator is not placed back at rest. Such an alarm device needs not be described for its structure will be evident to one skilled in the art it consists of a computer of which the entrance passes through a gate controlled by the "repeat" state of the index generator.

Figure 5:
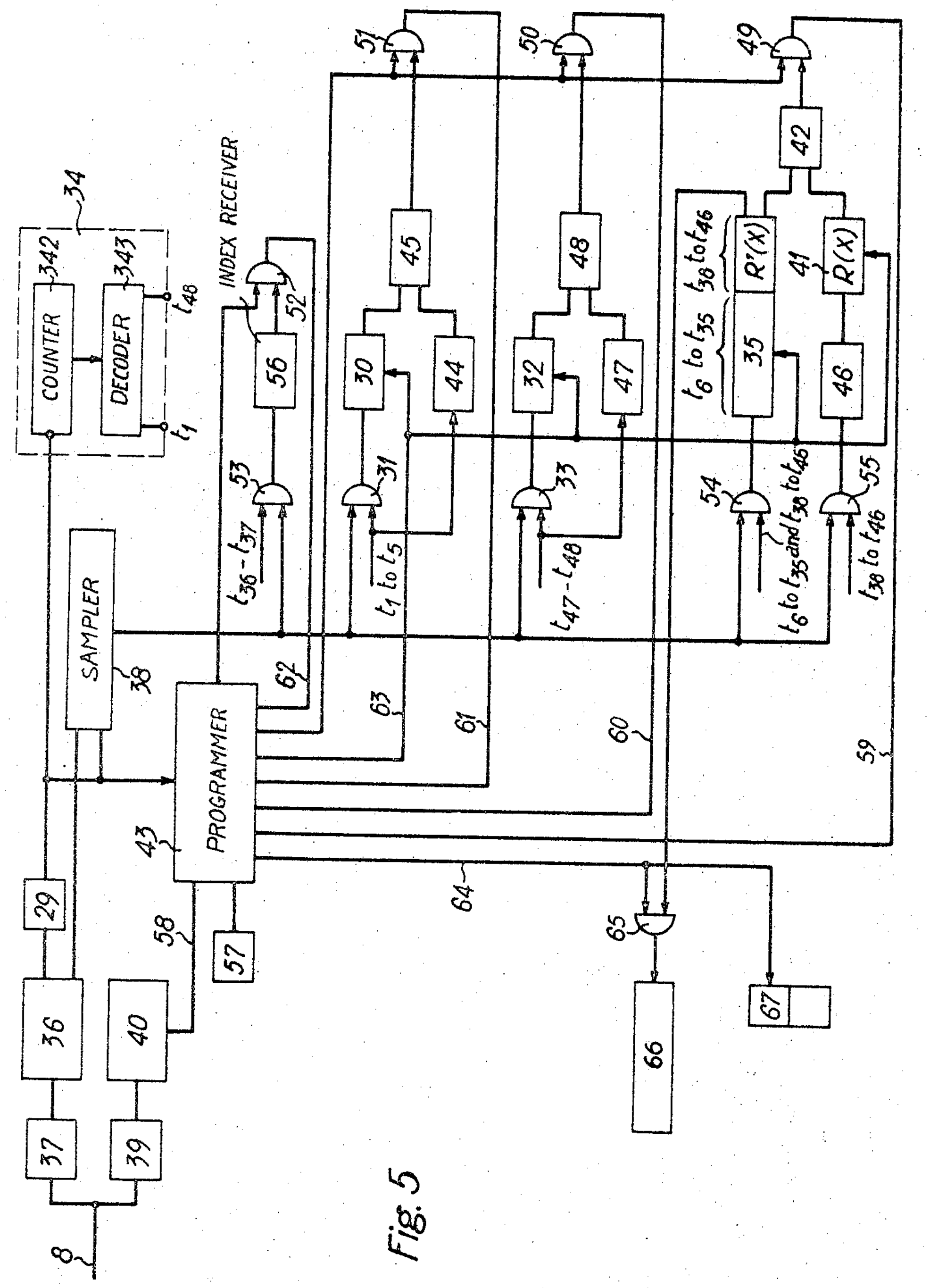
FIG. 5 represents the charge reception center associated with the charge registration center.

Referring to FIG. 5, transmission line 8 reaches the charge reception center at the input of a demodulator 36 through a high-pass filter 37, and at a output of an oscillator 40 through a low-pass filter 39. Demodulator 36 is connected on the one hand to a flywheel 29 and on the other hand to a sampler 38. Flywheel 29 is connected both to the input of a time-basis 34 comprising a counter 342 and a decoder 343, and to the input of a sampler 38. Thus the time-basis is synchronized with time-basis 14 and provides timing pulses $t_1$ to $t_{48}$. The pulses produced by flywheel 29 are also sent to a programmer 43 to start it on; the demodulated binary digits produced by sampler 38 are applied to a start signal detector 30 through a gate 31, to a stop signal detector 32 through a gate 33 and to a shift digit data register 35 through a gate 54. Finally, the demodulated binary digits of the orders 38 to 46 are sent through gate 55 to a divider by P(X) 46, at the exit of which is connected an output register 41 for the remainder R(X). The transmitted remainder R'(X) is found registered in compartments 38 to 46 of shift data register 35. Remainders R(X) and R'(X) are compared in a comparator 42. Likewise the start signal received in detector 30 is compared to the start signal provided by a start signal generator 44 in a comparator 45 and the stop signal received in detector 32 is compared to the stop signal provided by a stop signal generator 47 in a comparator 48. Generators 44 and 47 are released by timing pulses $t_1$–$t_5$ and $t_{47}$–$t_{48}$ respectively. Comparators 42, 45, and 48 are tested by programmer 43 at which at an instant following $t_{48}$ opens gates 49, 50, 51 and, according to whether the three comparisons are correct or incorrect, the programmer receives, or does not receive, a signal.

The signal "direct" or "repeated" is received in a reception register 56 through gate 53. It is also tested by programmer 43 which for this purpose opens gate 52 and receives or does not receive a signal over wire 62 according to whether the charge word is transmitted for the first or the second time.

Starting from the signals which it receives (or does not receive) over connection wires 59–62 the programmer works out the controls which it gives on wires: 58 to oscillator 40, 63 to registers 30, 32, 35, 41 to erase them, and 64 to a transfer gate 65 of the charge word. If all comparisons are correct and the charge word is transmitted for the first time, a signal is sent over wire 64, gate 65 is opened and the charge word registered in compartments 6 to 35 of memory 35 is transferred to incoming register 66 of the charge reception and registration center whilst at the same time an availability trigger 67 is placed in state one. A signal is also sent over wire 63 to reset the registers. If at least one of the comparisons is incorrect and a direct message is involved, oscillator 40 is inhibited over wire 58. When at least one of the comparisons is incorrect and a repeated message is involved, an alarm device 57 is actioned.

Register 66 is the incoming register of the charge reception and registration center. The memory of the charge reception and registration center is a magnetic durm 70 with a capacity of 32,768 words of 16 binary digits, distributed over 128 tracks of 256 words each. 112 tracks are reserved for account words and 16 tracks contain the address of overflowed subscribers. Drum 70 therefore makes it possible to handle 28,672 subscriber accounts.

The address of the subscribers such as they enter register 66 have eighteen binary digits. As they must be entered in compartment of 16 binary digits they are, in the charge reception and registration center, transcoded into pure binary code as will be shown next. On account tracks the words of sixteen binary digits contain eleven binary account digits, for subscribers's binary category digits and one binary imparity digit. On the overflow tracks the words of sixteen binary digits contain fifteen binary address digits and one binary imparity digit.

The charge class received by the charge reception center is for statistical purposes and is no longer used hereafter.

The charge reception and registration center can perform four different programs which will be shown successively by describing the circuits which they activate and their development.

Program No. 1 which is the main program is divided into five sub-programs:

(I) Transcoding of the address from coded decimal into pure binary code;

(II) registration of the new account on the drum;

(III) registration, if necessary, on the drum of the overflowed account;

(IV) memorizing of the address of the drum to be used for registering the next overflowed account;

(V) resetting of the registers and triggers.

Figure 6:
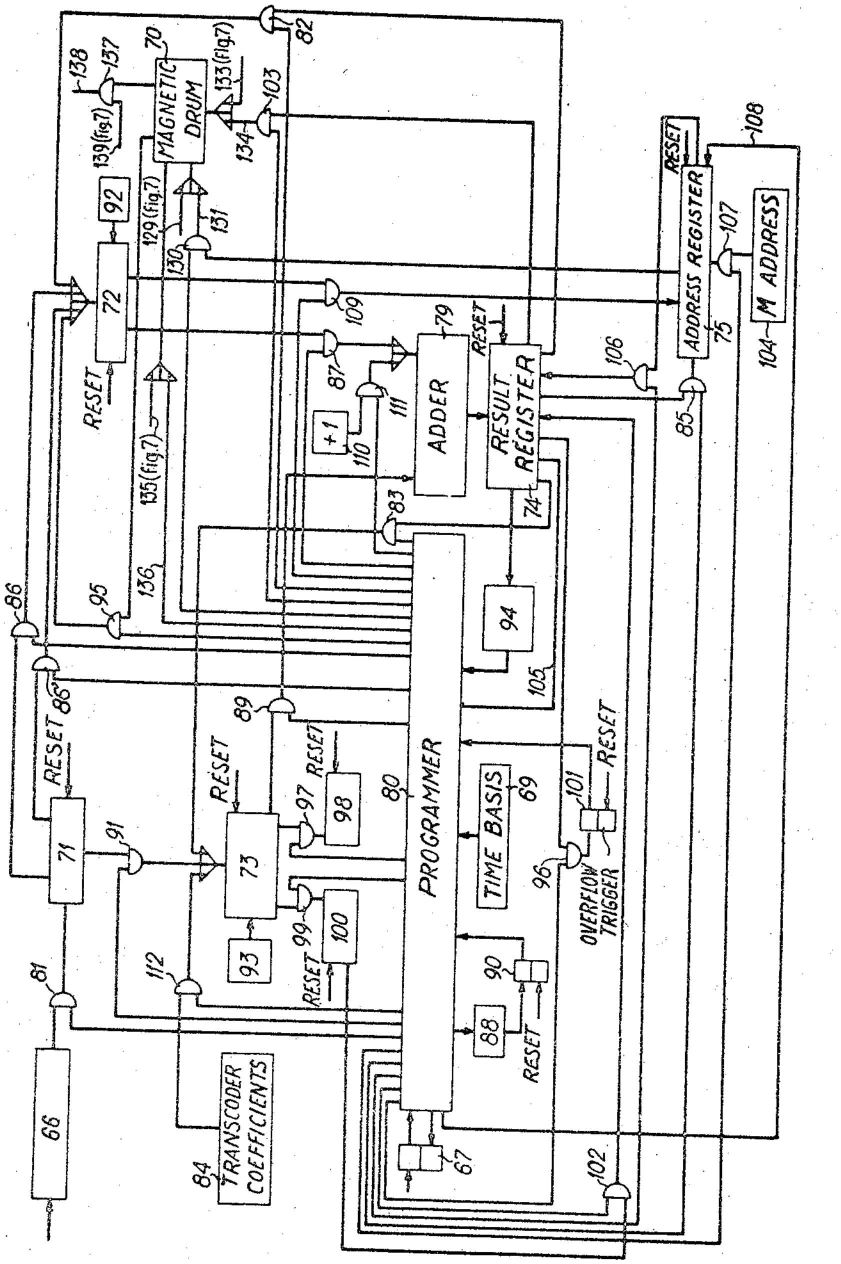
FIG. 6 represents the charge registration center for the principal program.
Figure 7:
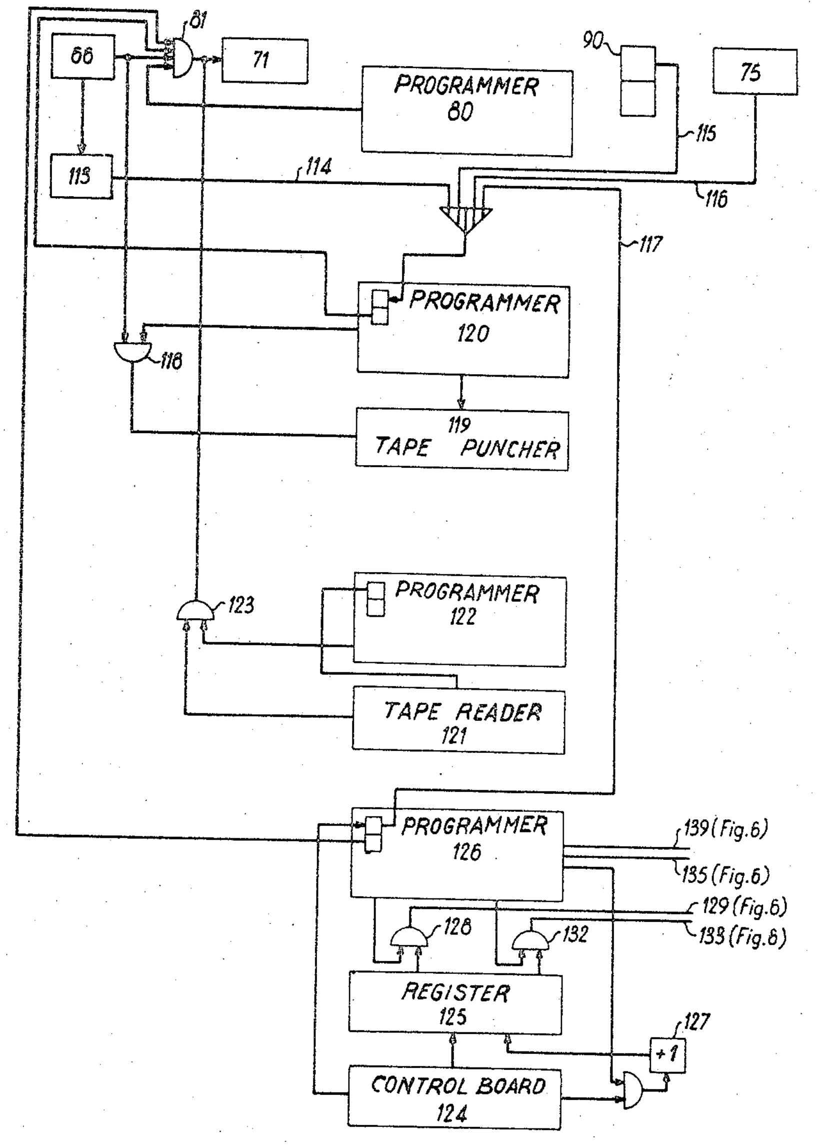
FIG. 7 represents the charge registration center for the secondary programs.

The circuits of program No. 1 contain (FIG. 6) a magnetic drum 70 and a time-basis 69, several registers 71, 72, 73, 74, 75, 76, 77, 78, an adder 79, code checking circuits 92, 93, and 94, a programmer 80 and a group of gates of which the respective functions will be seen further on. The charge word received by register 66 of the charge reception and registration center contains thirty binary digits, of which eighteen of address, four of subscriber's category, four of charge class and four of charge. This word is transferred from register 66 of the charge reception center to register 71 of the charge registration device through gate 81 opened by programmer 80 under certain conditions which will be seen further on.

*First sub-program.*—Transcoding of the address of the calling subscriber.

The address A*d* of the calling subscriber, written in pure binary code, is connected with this same address written in a code of which the decimal digits of said address are separately coded into binary code by the following relationship in which TT, Th, H, T, U respectively represent the tens of thousands, thousands, hundreds, tens and units:

$$Ad=(2^{13}+2^{10}+2^9+2^8+2^4)TT+(2^9+2^8+2^7+2^6+2^5+2^3)Th+(2^6+2^5+2^2)H+(2^3+2^1)T+2^0U$$

The binary numbers forming the multiplication factor of TT, Th, H, T, U in the preceding formula are contained in a permanent memory 84 and successively applied to register 73 through gates 112 and from there to adder 79 through gate 89. The quantities TT, Th, H, T, U of the address are applied simultaneously to register 72 through gates 86 and from there to adder 79 through gates 87. The results of the partial mutliplications are obtained in register 74 and transferred respectively: the result of the first partial multiplication to register 73 through gate 83 and the result of the second partial multiplication to register 72 through gate 82; they are then added together and the new result is transferred to register 73 and so on until the moment when the final result is entered in register 74.

The three registers 72, 73, 74 comprise imparity devices 92, 93, 94 respectively. Imparity devices 92 and 93 add to the data the desired imparity digit and imparity device 94 checks the imparity of the result. The parity checking of linear codes is well known in the technique (see for instance the work of W. Wesley Peterson, above referred to).

If the parity check is correct a signal is sent over check circuit 94 to programmer 80 which continues its program and opens gate 85 which causes the transferring of the address of the calling subscriber into address register 75 associated with the drum. If the parity check reveals an error, programmer 80 receives a signal from imparity device 94 which makes it return to the beginning of the sub-program. At the same time the programmer 80 sends a pulse to computer 88 which counts the errors and, after a pre-determined number of errors activates the so-called fault trigger 90.

At the end of the first sub-program and except for transcoding errors, the address of the calling subscriber account is in address register 75 associated with drum 70.

*Second sub-program.*—Registration of the new account on the drum.

Programmer 80 opens gates 91 which causes the transfer of the subscriber's category, the charge and the charge class to register 73; then it opens gates 97 for transferring the charge class to register 98 and gates 99 for transferring the subscriber's category to register 100. The programmer finally opens gates 89 to transfer the charge to adder 79, gates 95 to transfer the subscriber's account, of which the address is in address register 75 of drum 70, to register 72, then gates 87 to transfer said account to adder 79. The adder performs the addition of the account and charge and registers the new, totalized account in register 74.

Before re-inscription of the new account on the drum an overflow test is needed, i.e. the programmer checks that the new account does not have more than eleven binary diigts (or more generally, more digits than the number of binary digits reserved for the account itself in the part of the drum destined for a subscriber's account). For this purpose the trigger of register 74 corresponding to the binary digit of the eleventh order (twelfth binary digit from the right) is connected through gate 96 to a so-called over-flow-trigger 101. The state of 101 is transmitted to programmer 80 and according to this state the continuation of the program is different.

If there is no overflow (trigger 101 in state Zero) the subscriber's category is transferred to register 74 through gates 102 and the grouping of the new account and of the category is entered through gates 103 on drum 70 at the space of which the address is in address register 75. The programmer then goes on to the fifth sub-program.

If there is overflow (trigger 101 in state One), the binary digit of the eleventh order is changed to Zero by programmer 80 through connection 105. As of this moment the category and the new account are gathered in register 74 and transferred to the drum at the place of the calling subscriber whose address is stored in address register 75. But instead of passing to the fifth sub-program the programmer passes to the third sub-program.

*Third sub-program.*—Registration of the overflowed account on the drum.

At the opening of the description, it has been seen that, when an account overflows, the address A*d* of the applicant must be written in the first available compartment of the overflow zone and that the address of this available compartment is kept up to date in a special compartment of the overflow zone of the drum. The address of this special compartment is indicated by M.

The programmer, by opening gates 106, transfers address A*d* from register 75 to register 74 and, by opening gates 107, transfers address M from permanent memory 104 (of the same type as permanent memory 84) to address register 75. By opening of gates 95 the address contained in the address-compartment M is entered in register 72, then address M contained in register 75 is wiped out by the programmer (connection 108). The address of the first available overflow compartment is then transferred from register 72 to address register 75 by opening of gates 109. Finally, the contents of register 74, i.e. the address of the calling subscriber, is transferred to the first available overflow compartment, of which the address is then in address register 75, under the same conditions as the new account was transferred to the calling subscriber's compartment during the second sub-program.

*Fourth sub-program.*—Memorizing of the address of the drum compartment to be used for the next overflowed account.

At the end of the third sub-program the address from the overflow compartment, in which the calling subscriber's address A*d* has just been entered, is situated in address register 75. It is transferred to register 74 (opening of gates 106), next to register 73 (opening of gates 83), then to the first inputs of adder 79 (opening of gates 89). The second inputs of adder 79 are connected to a unit generator 110, by opening of gate 111.

Adder 79 adds a unit to the address of the overflow compartment now occupied and this new address, larger by one unit, is obtained in result register 74. Address M is again entered in address register 75, by opening of gates 107, and the address of the next available overflow compartment is entered in the special compartment of address M in the overflow zone of the drum by opening gates 103.

As has been above the account words contain sixteen binary digits, of which eleven account binary digits, four category binary digits and one imparity binary digit. After transcoding, the address words which contained eighteen binary digits now contain only fifteen; the sixteenth binary digit is an imparity digit. All calculations performed by adder 79 are governed, as far as imparity of the data is concerned, by imparity devices 92 and 93 and, as far as imparity of the results is concerned, by imparity device 94. After each error counter 88 advances one step and after a pre-determined number of steps error trigger 90 is turned to One. As will be seen the passage to position One of the error trigger releases the second program.

*Fifth sub-program.*—This sub-program concerns the reset of the registers and triggers. A signal is sent by programmer 80 over the terminals marked RESET.

Besides the principal or first program of the charge registration center there are three other programs which shall now be examined.

*Second program.*—Certain charge words, instead of being registered on the magnetic drum, are entered by a perforator 119 on a perforated tape.

This program takes place in several cases:

(a) The applicant is indexed in a special way or, in other words, his category is a special one;

(b) The first program has committed errors (one error or a pre-determined number of errors);

(c) The overflow zone of the drum is full;

(d) The fourth program requests one, or a series of accounts statements.

To detect condition (a) the trigger of register 66, corresponding to the storing of the subscriber's category, are connected to trigger 113. When these triggers form the particular category combination corresponding to the index a signal is applied to wire 114.

When the first program has committed one, or a certain number of errors a signal is sent over wire 115 by error trigger 90.

When the overflow zone of the drum is full a special combination is entered in register 75 at the time of searching for the first available overflow compartment (in the example described, where there are 16 overflow tracks of 256 compartments each, this combination is the binary translation of 4096). Address register 75 then sends a signal over wire 116.

Finally, when the fourth program is released, a program trigger situated in programmer 126 of this fourth program is placed in state One and sends a signal over wire 117. A signal over one of wires 114–117 places in position One the program trigger situated in programmer 120 of the second program.

The second program is then released. Gates 81 giving access to register 71, are closed, and gates 118 giving access to tape puncher 119 are opened. The charge words are henceforth perforated on tape until the first program is re-established.

*Third program.*—As has just been seen, in the case of disturbance of the first program, the second program is initiated and the charge words are registered on tape by perforator 119. After the first program has been put back into working order the perforated words are fed to tape reader 121. When starting to work the tape reader places the program trigger of programmer 122 in position One. This opens gates 123 and the charge words registered on the tape are transmitted to register 71 by tape reader 121.

*Fourth program.*—This program assures the writing-in, the reading-out and the erasing of one or several subscribed accounts or of a successive series of accounts.

This program contains a control-board 124 which, when operating, places the program trigger of programmer 126 of the fourth program into position One. This control-board makes it possible to enter in a register 125 a category and an address selected by an operator and possibly to put into action a step-by- step counter 127. This counter functions under the control of programmer 126.

Address register 125 is substituted for address register 75 of the drum by opening gates 128 (gates 130 then being closed) and the address is sent to the drum over wires 129 (instead of wires 131). The catagory is sent to the drum through opened gates 132 and wires 133 (instead of wires 134). The writing-in, reading-out or erasing order to the drum is applied by wire 135, substituted for wire 136. Finally, the information leaves the drum through gates 137 and wires 138, going to the telephone accounts office, gates 137 being opened by programmer 126 over wire 139.

In the foregoing it was often said that a programmer having received one or more signals initiates a new program step by sending to suitable circuits or gates a control signal. Programmers adapted to initiate and control steps the conditions of which depend upon the termination of previous steps by logical Boolean equations are well known in the art and will not be described herein in detail. Precisions on said programmer are given for example to U.S. Patent 3,206,553 issued Sept. 14, 1965 to Pierre M. Lucas and Jean F. Duquesne.

What we claim is:

1. A centralized telephone system for charging the subscribers of a plurality of telephone exchanges comprising charge transmission centers associated with said telephone exchanges and a single charge reception and registration center, in said charge transmission centers means for transmitting from said charge transmission centers to said charge reception and registration center binary charge words formed at least by a communication charge, the address of the subscriber having applied for said communication and a check group, and in said charge reception and registration center, means for receiving said charge words, means controlled by the received check group for selectively initiating the repetition of said charge words, a memory having subscriber's compartments respectively associated with said subscribers and containing the binary coded accounts thereof and omnibus overflow compartments, means for adding the old account of a subscriber written in a memory subscriber's compartment to the charge of a communication he has applied for and which is contained in said charge word and deriving therefrom a new binary coded account, means for testing the digit number of said new account, means for writing-in the new account of the said subscriber in the memory compartment associated thereto when said new account is smaller than the subscriber's compartment capacity and means for writing-in a predetermined account equal to the subscriber's compartment capacity together with the subscriber's address in an overflow compartment and the difference between the new account and the predetermined account in the subscriber's compartment when said new account is larger than the compartment capacity.

2. A centralized telephone system for charging the subscribers of a plurality of telephone exchanges comprising charge transmission centers associated with said telephone exchanges and a single charge reception and registration center, in said charge transmission centers means for transmitting from said charge transmission centers to said charge reception and registration center binary charge words formed at least by a communication charge, the address of the subscriber having applied for said communication, an index group having different binary values in function of the number of times the same binary charge word is transmitted and a check group, and in said charge reception and registration center, means for receiving said charge words, means controlled by the received check group for selectively initiating the repetition of said charge words and changing the index group thereof according to a number of repetitions, a memory having subscriber's compartments respectively associated with said subscribers and containing the binary coded accounts thereof and omnibus overflow compartments, means for adding the old account of a subscriber written in a memory subscriber's compartment to the charge of a communication he has applied for and which is contained in said charge word and deriving therefrom a new binary coded account, means for testing the digit number of said new account, means for writing-in the new account of said subscriber in the memory compartment associated thereto when said new account is smaller than the subscriber's compartment capacity and means for writing-in a predetermined account equal to the subscriber's compartment capacity together with the subscriber's address in an overflow compartment and the difference between the new account and the predetermined account in the subscriber's compartment when said new account is larger than the compartment capacity.

3. A centralized telephone system for charging the subscribers of a plurality of telephone exchanges comprising charge transmission centers associated with said telephone exchanges and a single charge reception and registration center, in said charge transmission centers means for transmitting from said charge transmission centers to said charge reception and registration center binary charge words formed at least by a communication charge, the address of the subscriber having applied for said communication and a check group, and in said charge reception and registration center means for receiving said charge words, means controlled by the received check group for selectively initiating the repetition of said charge words, a memory having subscriber's compartments respectively associated with said subscribers and containing the binary coded accounts thereof, omnibus overflow compartments and an overflow compartment address area, means for adding the old account of a subscriber written in a memory subscriber's compartment to the charge of a communication he has applied for and which is contained in said charge word and deriving therefrom a new binary coded account, means for testing the digit number of said new account, means for writing-in the new account of the said subscriber in the memory subscriber's compartment associated thereto when said new account is smaller than the subscriber's compartment capacity, means for reading out from said overflow compartment address area the address of an available overflow comparment, means for writing-in a predetermined account equal to the subscriber's compartment capacity together with the subscriber's address in said available overflow compartment and the difference between the new account and the predetermined account in the subscriber's compartment when said new account is larger than the compartment capacity and means for writing-in the address of the following available overflow compartment in the overflow compartment address area.

References Cited

UNITED STATES PATENTS

| | | | |
|---|---|---|---|
| 2,850,571 | 9/1958 | Bray et al. | 179—7 |
| 2,865,563 | 12/1958 | Wright et al. | 179—7 |
| 3,106,613 | 10/1363 | Mann et al. | 179—7 |
| 3,302,184 | 1/1967 | Lavenir | 340—172.5 |

PAUL J. HENON, *Primary Examiner.*

JOHN P. VANDENBURG, *Assistant Examiner.*

U.S. Cl. X.R.

179—7; 340—174.1